Oct. 15, 1968     L. TRACHTENBERG ET AL     3,405,899
VEHICLE DASHBOARD THERMOS BOTTLE AND UTILITY CLAMP HOLDER
Filed Nov. 14, 1966     4 Sheets-Sheet 2
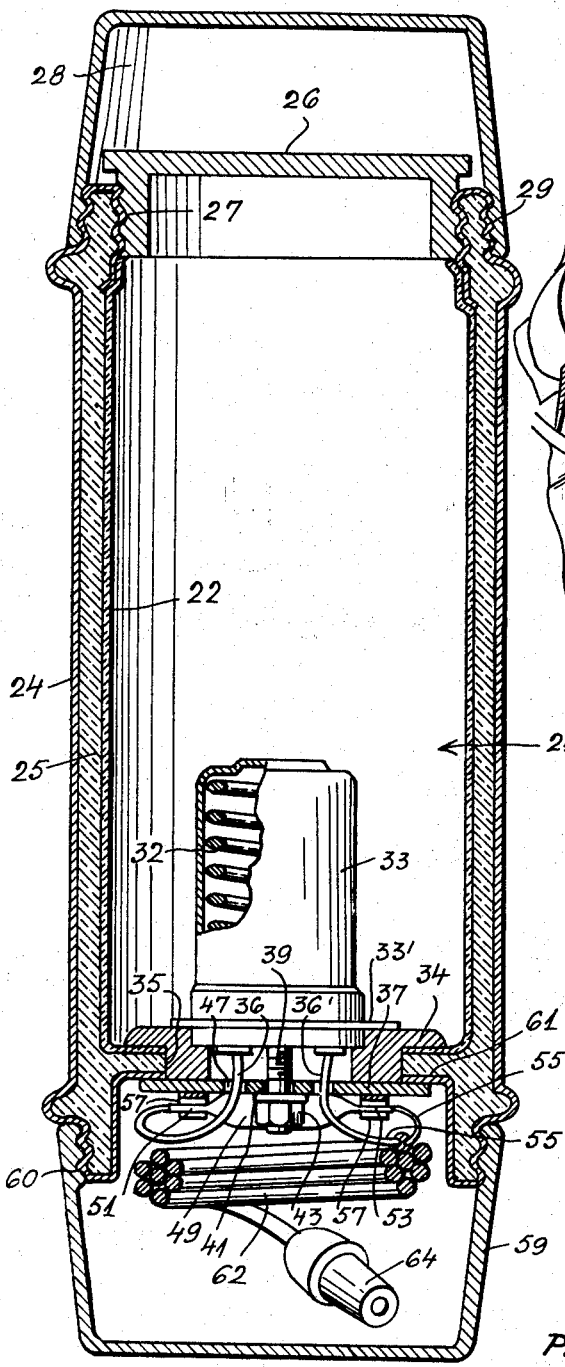
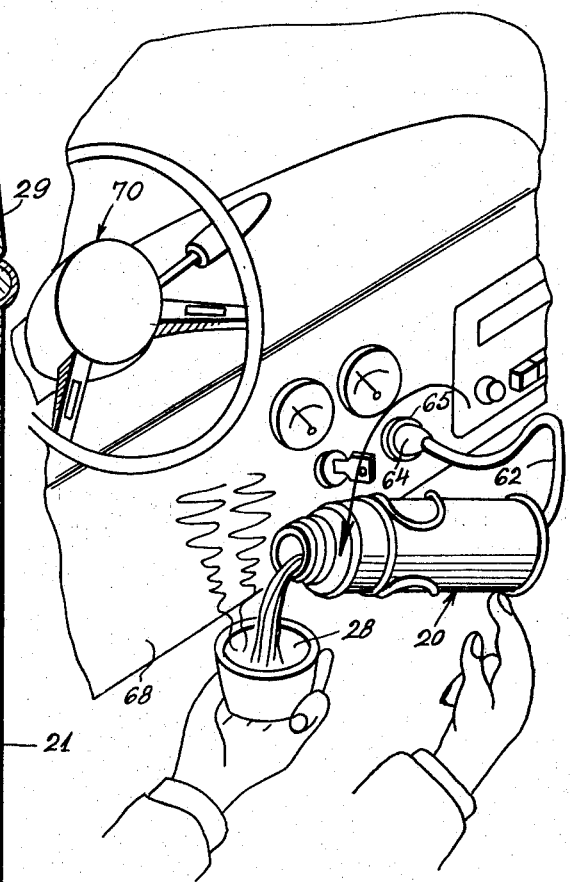
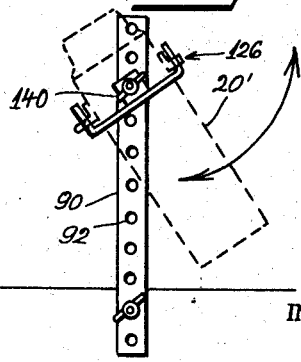
INVENTORS
LEONARD TRACHTENBERG &
PETER WARREN TRACHTENBERG
BY
*Polachek & Saulsbury*
ATTORNEYS

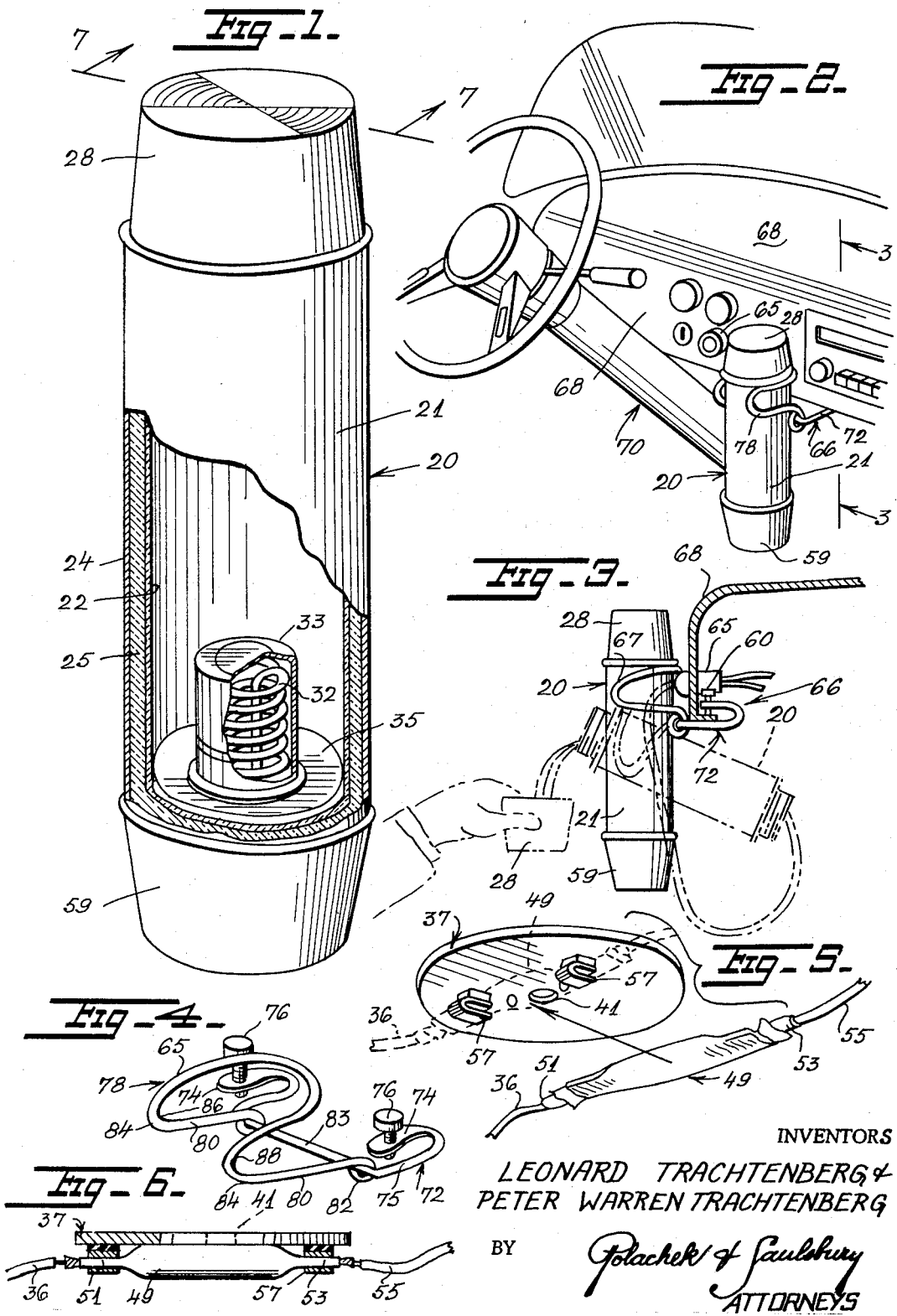

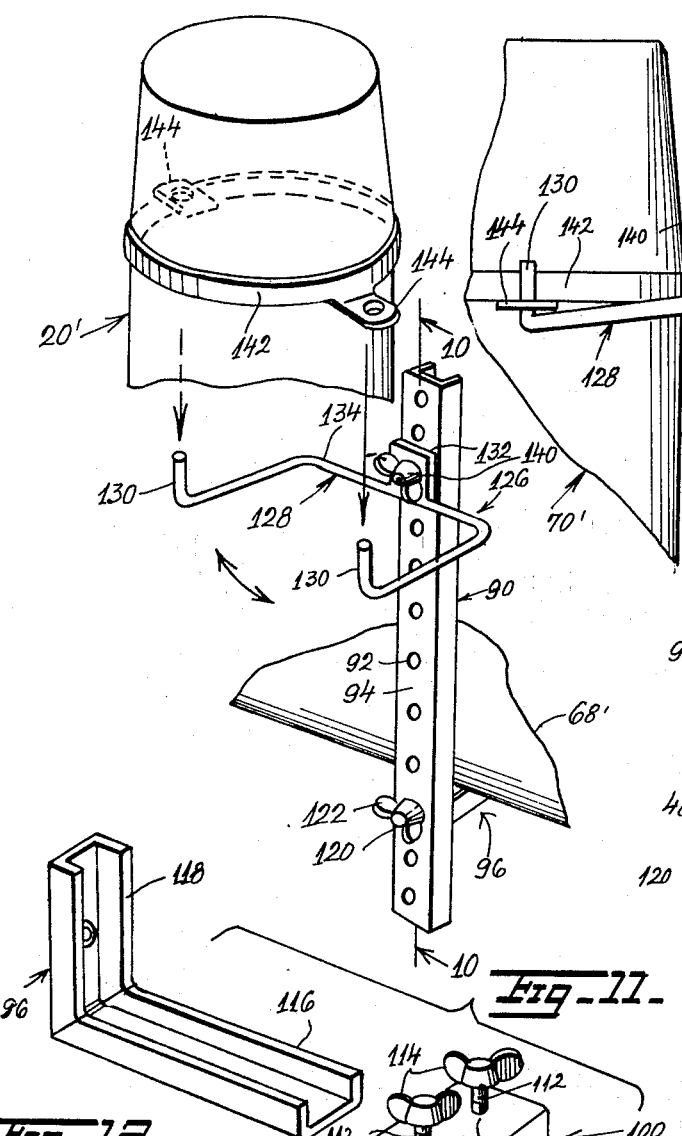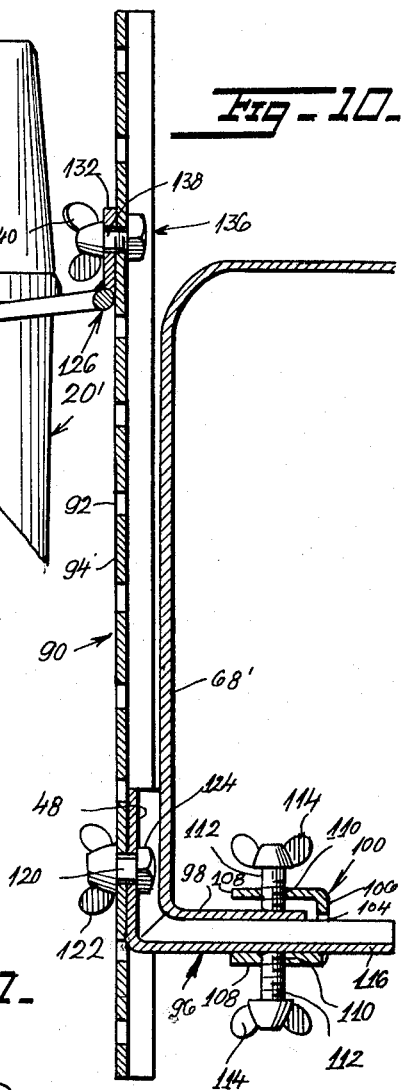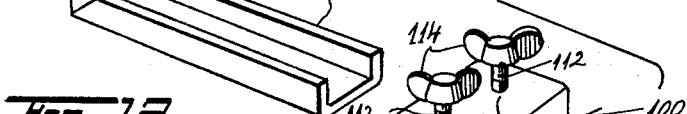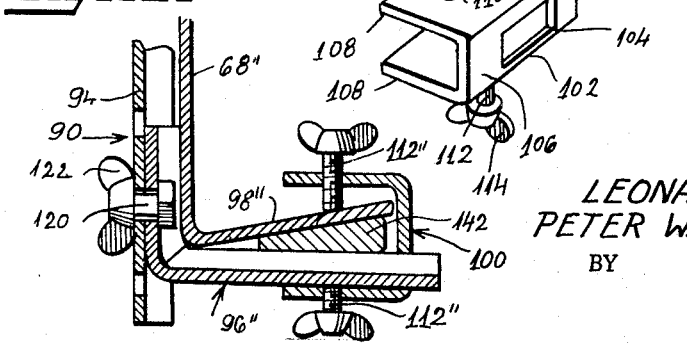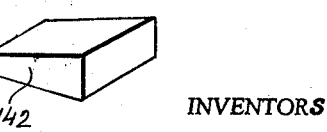

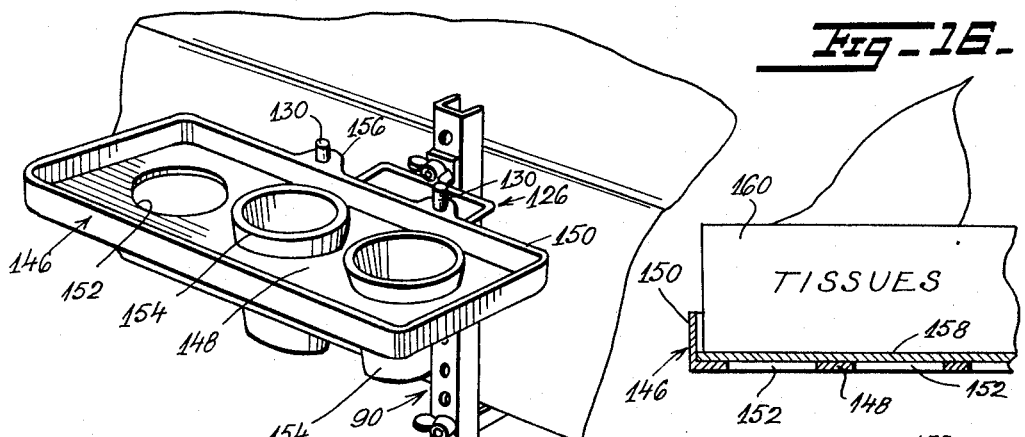

United States Patent Office 3,405,899
Patented Oct. 15, 1968

3,405,899
VEHICLE DASHBOARD THERMOS BOTTLE AND UTILITY CLAMP HOLDER
Leonard Trachtenberg and Peter Warren Trachtenberg, both of 512 Pleasant Valley Way, West Orange, N.J. 07052
Continuation-in-part of application Ser. No. 497,841, Oct. 19, 1965. This application Nov. 14, 1966, Ser. No. 593,887
1 Claim. (Cl. 248—229)

ABSTRACT OF THE DISCLOSURE

Clamping mechanism for mounting a bottle on a vehicle dashboard. The bottle is adapted to be detachably supported in a vertical position or in a tilted position to pour out the contents. The mounting mechanism is sectional, one section adapted to be clamped to the dashboard, the other section being pivotally connected to the one section for supporting the bottle in either upright or tilted position.

---

This invention relates to an insulated electrically heated bottle and more particularly to a holder for mounting the bottle as well as other items on a vehicle dashboard; and invention is an improvement over the disclosure of our copending application Ser. No. 497,841, filed Oct. 19, 1965, and this application is a continuation-in-part of the copending application.

Summary of the invention

Clamping means for supporting a bottle on the dashboard of an automobile. The clamping means is sectional including a U-shaped wire member, the end portions of the body of the member adapted to be screwed onto the dashboard. The other section is substantially U-shaped with curved arm portions terminating in eyelets connected to the bight portions of the U-shaped wire member, the curved arms adapted to engage a bottle and support it under tension in either an upright position or a tilted position.

One object of the invention is to provide improved holder means for mounting an insulated thermos-like bottle on the vehicle dashboard such that the bottle may be tilted to pour off its contents.

Other objects of the invention are to provide means for detachably supporting a device upon the dashboard of a vehicle for holding drinking glasses and the like in upright position, for holding cleaning tissues and the like in stacked position, for clampingly holding a road map and the like in a flat condition and for holding a waste paper container in an upright position.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a vertical perspective view of an insulated bottle embodying the invention, parts being broken away to show internal construction thereof.

FIG. 2 is a perspective view on a reduced scale, showing the bottle supported by a spring clamp mounting on the dashboard of a vehicle.

FIG. 3 is a vertical sectional view taken on the plane of the line 3—3 of FIG. 2.

FIG. 4 is a perspective view on an enlarged scale of the spring clamp mounting shown in FIGS. 2 and 3.

FIG. 5 is a disassembled perspective view of the thermostat and the supporting plate therefor.

FIG. 6 is a part elevational and part sectional view showing the parts of FIG. 5 in assembled relation.

FIG. 7 is a vertical sectional view taken generally on the plane of the line 7—7 of FIG. 1 on an enlarged scale, parts being shown broken away.

FIG. 8 is a perspective view similar to FIG. 2 showing the bottle in tilted position pouring the contents into a cup.

FIG. 9 is a part perspective view of a further modified form of a detachable tiltable mounting for a bottle.

FIG. 10 is a vertical sectional view taken generally on line 10—10 of FIG. 9 on an enlarged scale.

FIG. 11 is a disassembled perspective view of the elbow and clamp of FIG. 10.

FIG. 12 is a vertical sectional view of a modified form of arrangement for clamping the elbow to the vehicle dashboard.

FIG. 13 is a top perspective view of the wedge shown in FIG. 12.

FIG. 14 is a top perspective view of the form of mounting of FIG. 9 shown supporting a tray for utensils on the vehicle.

FIG. 15 is a top perspective view of the tray of FIG. 14 with cover plate detached therefrom.

FIG. 16 is a vertical sectional view through the longitudinal center of the tray of FIG. 14 shown supporting a stack of tissues.

FIG. 17 is a top perspective view of the mounting of FIG. 9 shown supporting a clip-board with a road map thereon.

FIG. 18 is a perspective view of the top of a container for holding a trash bag that is adapted to be detachably supported on the mounting of FIG. 9, parts being shown broken away.

FIG. 19 is a front elevational view of the mounting of FIG. 9 with illustration made of the manner in which the insulated bottle is mounted thereon and tilted.

Referring first to FIGS. 1 to 8, there is shown a heated insulated bottle 20 including a cylindrical body 21 defined by concentric inner and outer thin walls 22, 24 with a thermal insulation filler 25 therebetween. The upper end of the bottle body 21 is closed by an inner threaded cap 26 screwed into the mouth of body 21 and engaged by internal threads 27 formed at the top of inner wall 22. A cup 28 is removably screwed on outer threads 29 of outer wall 24. To the extent described, the bottle is substantially conventional.

This bottle 20 has a coiled electrical resistance heater element 32 disposed on a thermal and electrically insulated plug 34 fitted into an opening 35 at the bottom of the bottle body. The coil 32 is housed in a cylindrical hollow casing 33 closed at the top and bottom and having an annular flange 33′ adjacent the bottom end thereof which rests on the top of the plug 34. A circular perforated plate 37 is secured to the under surface of the plug 34 and to the bottom of the bottle 20 and the casing 33 is fixed thereto by means of a depending post 39 extending from the casing 33 and through holes 47 in the plate 37. An enclosed bimetallic thermally-responsive switch element 49 is connected at one end to the wire 36 by means of an electrical contact 51 and is connected at its other end by means of an electrical contact 53 to a current supply wire 55. Another supply wire 55' is connected directly to the other wire 36' of the heating element 32. The thermal element is supported on the underside of the plate 37 by means of spring clips 57 and its contacts 51 and 53. The plate 37 is housed in another cup 59 internally screw threaded detachably at its free ends to threads 60 on the bottom end of body 21. Outer wall 24 extends inwardly and upwardly from threads 60 to define a cupshaped flange 61 underlying plug 34. The wires 55 and 55' are formed into an electric cable or cord 62 which terminates in a plug 64 for engagement with a receptacle 65 on the dashboard. The cord 62 is housed in cup 59.

A spring clamp mounting 66 is provided for supporting the bottle 20 in an upright position, but pivotable thereon, on the dashboard 68 of a vehicle 70. This mounting has a generally U-shaped wire member 72 formed with flattened portions 74 at ends of its bent arms 75, FIG. 4. The flattened portions 74 support screws 76. These screws 76 can engage on inner inwardly-extending bottom flange 77 of the dashboard 68 as clearly shown in FIG. 3 to provide a stationary support. A spring clamp 78 forms part of mounting 66. This clamp 78 is formed from a bent piece of wire. The wire is bent U-shaped to define two curved arms 80 which have end loops or eyes 82 pivotally engaged on straight bight 83 of member 72, but frictionally holding the clamp in normal horizontal position. Two opposed intermediate loops 84 are formed in clamp 78 to define double curved arms 86 and 88 yieldably embracing the body 21 of the bottle 20 under spring tension, holding it axially upright, as clearly shown in FIGS. 2 and 3. The bottle 20 can be tilted from an axially-upright balanced vertical position to an inclined position as illustrated in dotted lines in FIG. 3 for emptying liquid contents of the bottle into cup 28 or 59. The plug 64 at the end of cable 62 can be inserted into the usual cigarette lighter receptacle 65 on the dashboard of the vehicle for energizing heating element 32. The energized heating element will heat the contents of the bottle.

In FIGS. 9 to 11, modified means for supporting the bottle 20' in upright position on the vehicle is shown. In this form, an elongated channel-shaped post 90 formed with spaced holes 92 in the web portion 94 thereof is adjustably and detachably fixed to a channel-shaped elbow 96 clamped to the under side 98 of a dashboard 68', by a clamping structure 100. The clamping structure 100 includes a U-shaped body 102 formed with a rectangular-shaped opening 104 in its bight portion 106. The leg portions 108, 108 are each formed with a pair of threaded holes 110 to receive a clamping screw 112 with knob 114 whereby one leg 116 of the elbow 96 extends through the opening 104 and is clamped to the dashboard. The other leg 118 of the elbow 96 is adjustably fixed to the inner surface of the web portion 94 of channel shaped post 90 by a screw 120 passing through hole 92 in the post and having a wing nut 122 at one end outside the post and having a lock nut 124 inside the post for fastening the post and elbow to each other.

A bracket assembly 126 is detachably and adjustably mounted on the post 90 adjacent its top end as viewed in FIG. 9. This bracket assembly 126 includes a U-shaped wire body 128 with upwardly bent free ends 130. A perforated substantially-square plate 132 is formed integrally with a bight portion 134 of the wire body 128 extending upwardly. The U-shaped body 128 is adapted to be held against the post 90 by means of a threaded bolt and nut assembly 136, the shank 138 of the headed bolt extending through one of the holes 92 in the post 90 and clamped to the plate by the wing nut 140.

The U-shaped body 128 when in the horizontal position shown in FIGS. 9 and 10 is ready to receive and support a bottle 20' having a metal band 142 therearound with opposed perforated brackets 144. The brackets 144 are slipped over the free bent ends 130 of the body as shown in FIG. 10 whereby the bottle is detachably held in upright position as shown in FIG. 10. The bottle 20' may be swung clockwise or counter-clockwise and viewed in FIG. 19 by merely loosening the wing nut 140 of the bolt and nut assembly 136.

A more secure attachment of the elbow 96" to the dashboard 68" may be obtained by inserting a wedge-shaped insert 142 under the end edge of the underside 98" of the dashboard and then tightening up on the clamping screw 112" thereabove as shown in FIG. 12.

The mounting assembly shown in FIG. 9 is also adapted to support a tray structure in level position for supporting drinking cups in upright position and cleaning tissues in stacked position as shown in FIGS. 14 and 16. A metal tray 146 is shown including a flat rectangular body 148 with flanged periphery 150 forming a shallow tray. The body is formed with spaced round openings 152 adapted to receive and support in upright position various household articles such as drinking glasses or tumblers 154 shown supported in the openings. These glasses or tumblers 154 may be tapered or formed with end flanges. One of the long flanged edges is formed with laterally-extending integrally-perforated ears 156 whereby the tray may be slid over the top of the bent ends 130 of the bracket 126 and supported in operative level position as shown in FIG. 14. The tray 146 may be provided with a removable cover 158 as shown in FIG. 15.

In FIG. 16, the tray 146 is shown supporting a stack of cleaning tissues 160.

A rectangular-shaped solid board 162 having a piece 164 at the head thereof is shown supported in operative horizontal position in FIG. 17 on the mounting assembly shown in FIG. 9. The body of the board 162 and the head piece 164 are formed with aligned holes 166 to receive the bent ends 130 of the bracket 126. The board 162 is adapted to support in flat condition, road maps 168 or the like clamped together by a metal spring clamp 170.

The mounting assembly shown in FIG. 9 is also adapted to support in upright position a container such as the container 172 shown in FIG. 18 having a rectangular-shaped hollow body 174 closed at thee sides and bottom and being open at the top. A trash bag lining 176 is provided for the body. The rim of the open top of the body is formed with spaced perforated ears 178 for receiving the bent ends 130 of the bracket 126.

In order to use the bottle 20, the plug 64 is plugged into a convenient outlet such as the cigarette lighter receptacle 65 on the dashboard 68 of the vehicle 70 as shown in FIGS. 3 and 8. If the unit is plugged into current, without any liquid present, or, if liquid present has evaporated below coil level, then the bimetallic element 49 serves as a thermostatic switch member, breaking contact so as to avoid damage to the unit. The thermal element 49 when heated will fracture the connection between the end contacts or terminals 51 and 53 to open the power supply circuit and cut off the electrical energy supplied to the heating element 32. This thermal element will be sufficiently sensitive to maintain the contents of the bottle at a desired temperature.

While we have illustrated and described the preferred embodiments of our invention, it is to be understood that we do not limit ourselves to the precise constructions herein disclosed.

What is claimed is:

1. In a device of the kind described, clamping mechanism for mounting an article of manufacture detachably and tiltably in a stationary support, said mechanism including a body with radially extending spaced arms adapted to detachably engage the article, the body being sectional, one section being formed of a wire in U-shape and the arms being bent at their ends, the arms having flattened portions adapted to engage a stationary support, said flattened portions having holes therein, and screws extending through the holes in the flattened portions for securing the body to the support, the other section being formed of wire and bent into U-shape having curved spaced arms with loops on the ends of the curved arms for attachment to the U-shaped one section, and double curved arms on the other section, open at one side for receiving and yieldingly embracing the supported article, under tension.

References Cited

UNITED STATES PATENTS

| | | | |
|---|---|---|---|
| 697,901 | 4/1902 | Thurber | 248—316.5 |
| 910,158 | 1/1909 | Walker | 248—229 |
| 1,192,112 | 7/1916 | Porter. | |
| 2,084,162 | 6/1937 | Packard | 248—313 X |
| 2,518,538 | 8/1950 | Giblin | 248—226 X |

ROY D. FRAZIER, *Primary Examiner.*

R. P. SEITTER, *Assistant Examiner.*